INVENTORS.
Robert E. Pickett
Charles H. Willyard
BY Brown Jackson Boettcher & Dienner INVENTOR.
Robert E. Pickett
Charles H. Willyard
BY [signature]

INVENTORS.
Robert E. Pickett
Charles H. Willyard
BY Brown, Jackson, Boettcher & Dienner INVENTORS.
Robert E. Pickett
Charles H. Willyard
BY Brown Jackson Boettcher & Dienner Nov. 7, 1961 R. E. PICKETT ET AL 3,008,008

AUTOMATIC TELEPHONE SYSTEM

Filed May 16, 1957 5 Sheets-Sheet 5

INVENTORS.
Robert E. Pickett
Charles H. Willyard
BY

3,008,008
AUTOMATIC TELEPHONE SYSTEM

Robert E. Pickett, Galion, Ohio, and Charles H. Willyard, Wheaton, Ill., assignors to North Electric Company, Galion, Ohio, a corporation of Ohio Filed May 16, 1957, Ser. No. 659,626
6 Claims. (Cl. 179—15)

Figure 1A:
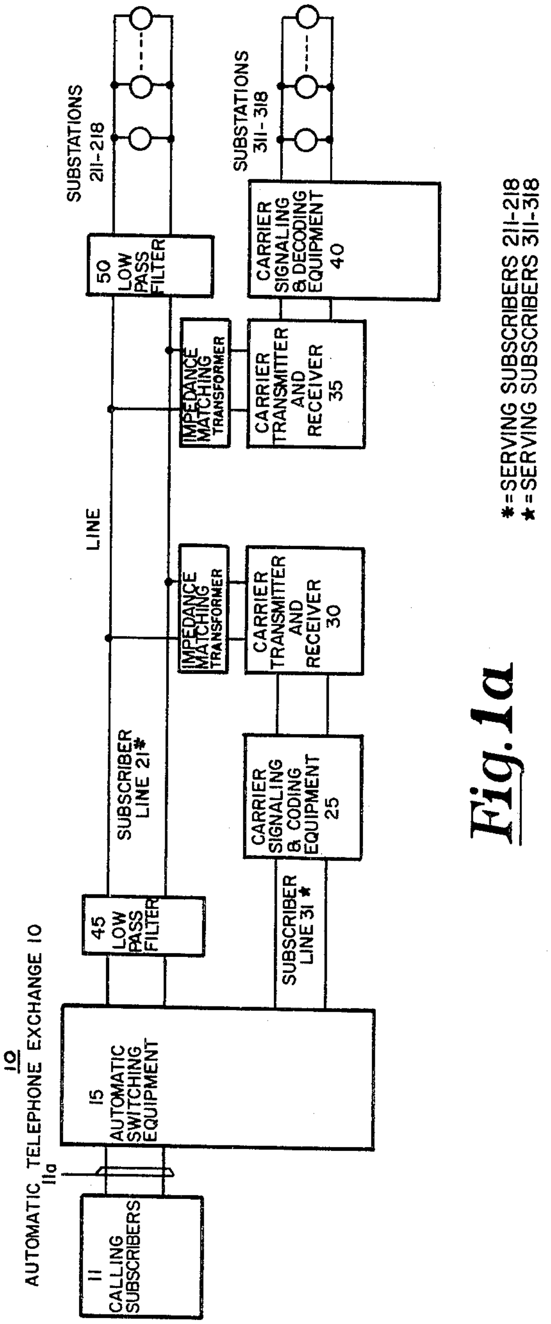

The present invention relates generally to an automatic telephone system, and more particularly to the transmission of ringing signals over a carrier system to subscribers on multi-party carrier lines.

There has been over the years an increased demand for telephone service in rural areas, which demand has in turn created serious problems for the exchange operator. That is, the limited number of subscribers in many areas renders the construction of a small community exchange prohibitive from the cost standpoint, and in many instances even the installation of new lines to the area is not practical. As a result, there has been an increased use of carrier systems which may be connected to existing metallic circuits in such manner as to serve subscribers in addition to the subscribers previously connected thereto. In such arrangement, a portion of the carrier equipment is connected at the central office for use with predetermined ones of the lines, and additional equipment is connected to the lines in the vicinity of the subscribers to be served thereby. In operation, the voice currents of the subscribers are transmitted over the existing equipment at different carrier frequencies, whereby several conversations may be transmitted on the channel simultaneously, and a more expeditious use of each existing metallic pair of lines is accomplished.

Carrier equipment has other advantageous applications including the ability to provide service for waiting list customers in areas where the delay in the provision of additional trunking is encountered. Further the use of such equipment with existing metallic line equipment permits the exchange operator to serve potential outlying customers which are located beyond the terminating point of existing lines without requiring the cost of new construction to such point. Carrier equipment may also be used to provide private, two party, and four party lines over existing equipment with a resulting improvement in rate earnings, or to meet demands for special temporary service, such as resorts, construction camps, etc., where the carrier equipment must be readily moved to meet the changing requirements. Carrier equipment can also be used to offer improved service to customers who are presently being served on over-crowded lines without requiring the purchase and installation of additional expensive trunking equipment. These and many other advantages have resulted in increased use of carrier equipment in automatic telephone systems.

In addition to providing voice channels for the subscribers, a carrier system must also be capable of selectively ringing the different carrier subscribers, and it is an object of the present invention to provide a new and novel carrier signalling circuit for use with such equipment. It is a particular object of the invention to provide a signalling circuit capable of selectively ringing with a single ringing frequency, the different subscribers on a multi-party carrier line with a minimum amount of equipment and at a reduced cost.

Figure 3:
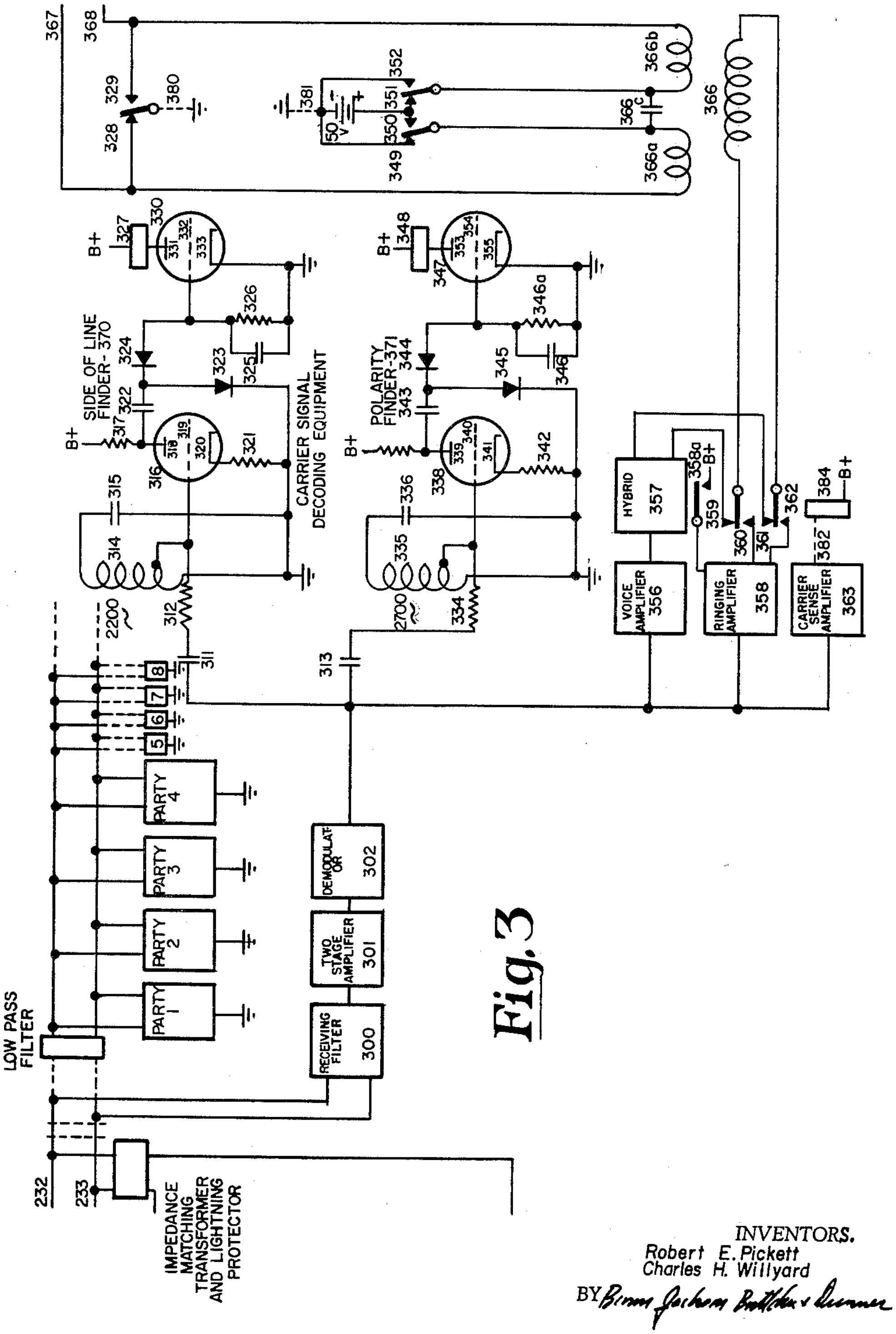
Figure 4:
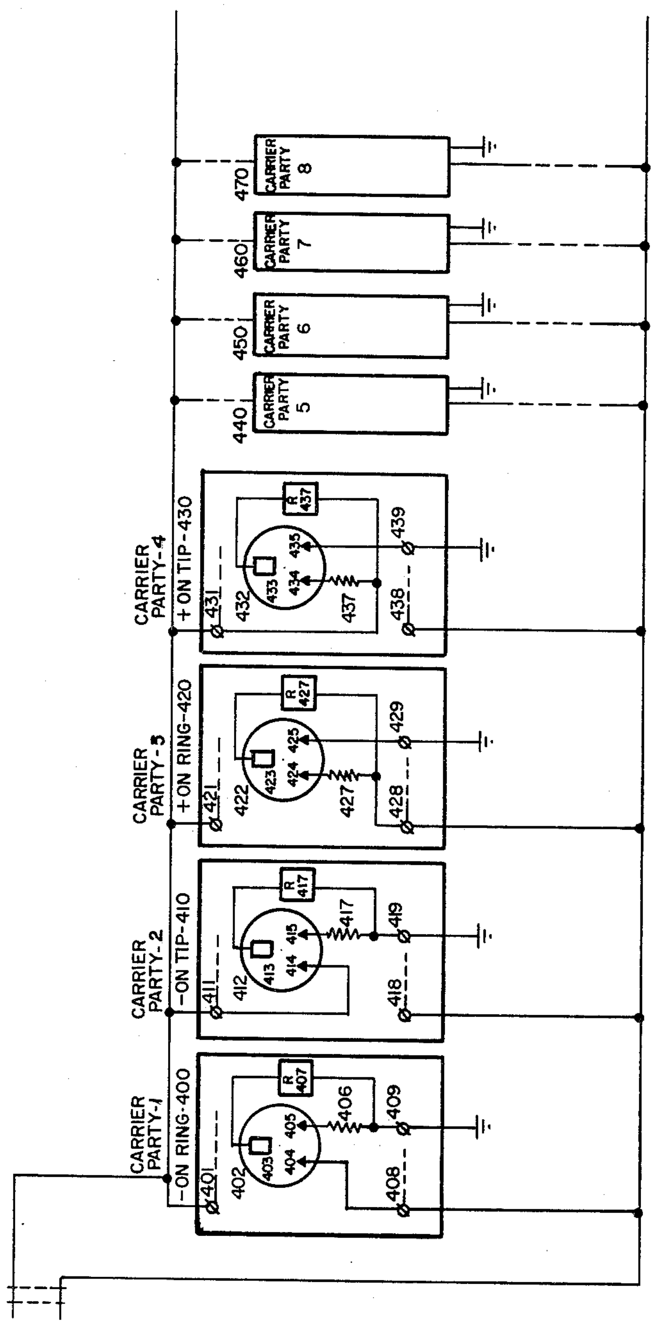
Figure 5:
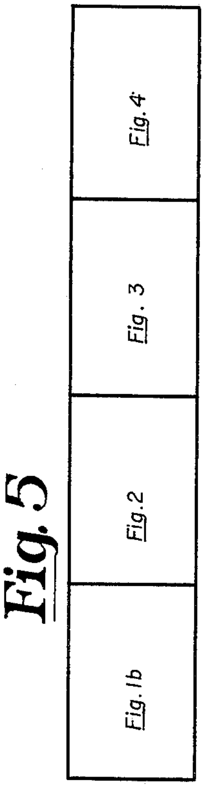

These and other advantages of the invention may best be understood by reference to the following description taken in connection with the accompanying drawings, in the several figures of which like reference numerals identify like elements, and in which:

FIGURE 1*a* is a block diagram of an automatic telephone system including an embodiment of the invention;

FIGURES 1*b*, 2, 3, and 4 are schematic diagrams illustrating various portions of an embodiment of the invention; and FIGURE 5 is a block diagram illustrating the relationship of FIGURES 1*b*–4, each to the other.

GENERAL DESCRIPTION

There is set forth herein a novel signalling arrangement including a novel signalling pattern for effecting selective ringing of the subscribers on a four party carrier subscriber line selectively or on an eight party carrier subscriber line semi-selectively. The signalling for differentiating between parties 1–4 and 5–8 is basically accomplished by providing different coded ringing signals of different polarities (alternating current superimposed on a direct current of different polarities) and applying same to different sides of the line. The ringing voltage itself is basically represented by the presence and absence of carrier over the channel during the period the connection is being established. The side of the line to be rung is represented by the presence and absence of a first carrier modulating tone F1, and the polarity of the transmitted signal is represented by the presence and absence of second carrier modulating tone F2. This particular signalling pattern minimizes the equipment required to achieve selective signalling of the subscribers on a multiparty line, and constitutes a particular feature of the invention.

With reference to FIGURE 1*a*, one embodiment of an automatic telephone exchange including the novel signalling equipment of the invention is shown thereat in block form. More specifically automatic telephone exchange 10 includes a plurality of substations such as illustrated substation 11, having access over line **11*a* and automatic switching equipment 15 to lines, such as for example illustrated lines 21, 31, etc. Subscriber lines, such as 21, may comprise a conventional metallic wire circuit which extends from the exchange to the vicinity of the subscriber substations which are connected to the line, as for example, the illustrated substations which have assigned directory numbers 211–218 respectively. The same metallic conductors which serve line 21 may have a plurality of carrier substations, having directory numbers 311–318 connected thereto, access to such substations being afforded thec alling subscribers over the connector terminals 31 and line 21. Thus if line 21 is selected the automatic switching equipment 15 transmits superimposed ringing signals thereto which directly select a subscriber of the group 211–218 respectively. If line 31 is selected, the automatic switching equipment signals the carrier equipment with these superimposed ringing signals; the carrier equipment transmits signals representative thereof over the carrier channel; and the distant carrier equipment in turn signals the distant carrier subscribers with the superimposed ringing signals. It is noted that a line such as 21 that serves both physical and carrier subscribers must have low pass filters 45 and 50 isolating the carrier equipment from line 21** entrance to the atuomatic switching equipment and from the physical phones, respectively.

More specifically, as a calling subscriber utilizes a substation, such as 11, and thus controls the automatic switching equipment, such as 15, to seize line 31, a set of carrier signalling and coding equipment 25 associated with line 31 controls the transmitter of an associated carrier transmitter and receiver unit 30 to extend ringing signals and subsequently speech frequencies over the metallic pair of conductors constituting line 21. In the vicinity of the carrier substations, carrier drop wires are connected to the metallic conductors which constitute line 21, and the carrier signals are extended over the receiver of an associated carrier signal transmitter and receiver equipment 35 to carrier signalling and decoding equipment 40 which analyzes the incoming carrier signals indicative of superimposed ringing and transmits coded ringing signals to the carrier party line. Carrier subscriber substations 311–318 are each connected to the lines to respond as a result of preassigned ones of the incoming carrier signals, selective ringing in the illustrated embodiment being achieved by applying coded signals of which the direct current component has different polarities to alternate sides of the line, as shown in more detail hereinafter. As the called party answers, a carrier talking circuit is extended between the calling and called subscribers in the conventional manner.

The details of the novel signal circuit and its manner of operation are now set forth in detail.

CALL INITIATION

A. *Registration of digits by calling subscriber*

With reference to FIGURES 1*b*–4, it will be apparent that as the calling subscriber removes his receiver from substation 11, the conventional automatic switching equipment 15 thereat, including a line circuit 101 and line-finder 102, are signalled over line 11*a* and operate with associated guard and allotter circuits (not shown) to extend the calling line loop over conductors 103 and 104 to the line relays 111, 112 of an associated connector switch, such as illustrated connector switch 110. Dial tone is returned to the calling subscriber at the substation 11 to indicate that the equipment has been seized and prepared for further extension of the call. The calling subscriber now dials the directory number of the desired party (which, in the illustrated example, is 311) to control the counting chain 115 in the connector 110 to operate units relay C1 and tens relays C30, and to prepare the equipment for receipt of the ring digit.

In the interest of facilitating the description of the present invention, the detailed circuitry of the counting chain and other relays in the connector have been omitted herein. Briefly stated, the manner in which the counting chain is advanced responsive to receipt of each of the digits dialed by the calling party, the manner in which the chain effects selection of the tens relays responsive to receipt of the first digit, the manner in which the chain effects selection of the units relay responsive to receipt of the second digit, the manner in which the counting chain is restored following each of such operations, and the manner in which the chain is held following receipt of the last or ringing digit, are well known in the art. A detailed description of such switch operation may be found in the copending application which was issued as Patent No. 2,807,669 to Arne Oxaal on September 24, 1957, and assigned to the assignee of this invention.

A brief summary chart is included herewith to facilitate the description relating to the circuits selected by the counting chain responsive to the dialing of different digits by the calling party.

CHART I

| Called Substation | Counting Chain Operates | | To Select Line |
|---|---|---|---|
| | Tens Relay | Units Relay | |
| 211 | C20 | C1 | 21 (Conductors 201 and 202). |
| 212 | C20 | C2 | 21. |
| 213 | C20 | C3 | 21. |
| 214 | C20 | C4 | 21. |
| 215 | C20 | C5 | 21. |
| 216 | C20 | C6 | 21. |
| 217 | C20 | C7 | 21. |
| 218 | C20 | C8 | 21. |
| 311 | C30 | C1 | 31 (Conductors 203 and 204). |
| 312 | C30 | C2 | 31. |
| 313 | C30 | C3 | 31. |
| 314 | C30 | C4 | 31. |
| 315 | C30 | C5 | 31. |
| 316 | C30 | C6 | 31. |
| 317 | C30 | C7 | 31. |
| 318 | C30 | C8 | 31. |

Figure 1B:
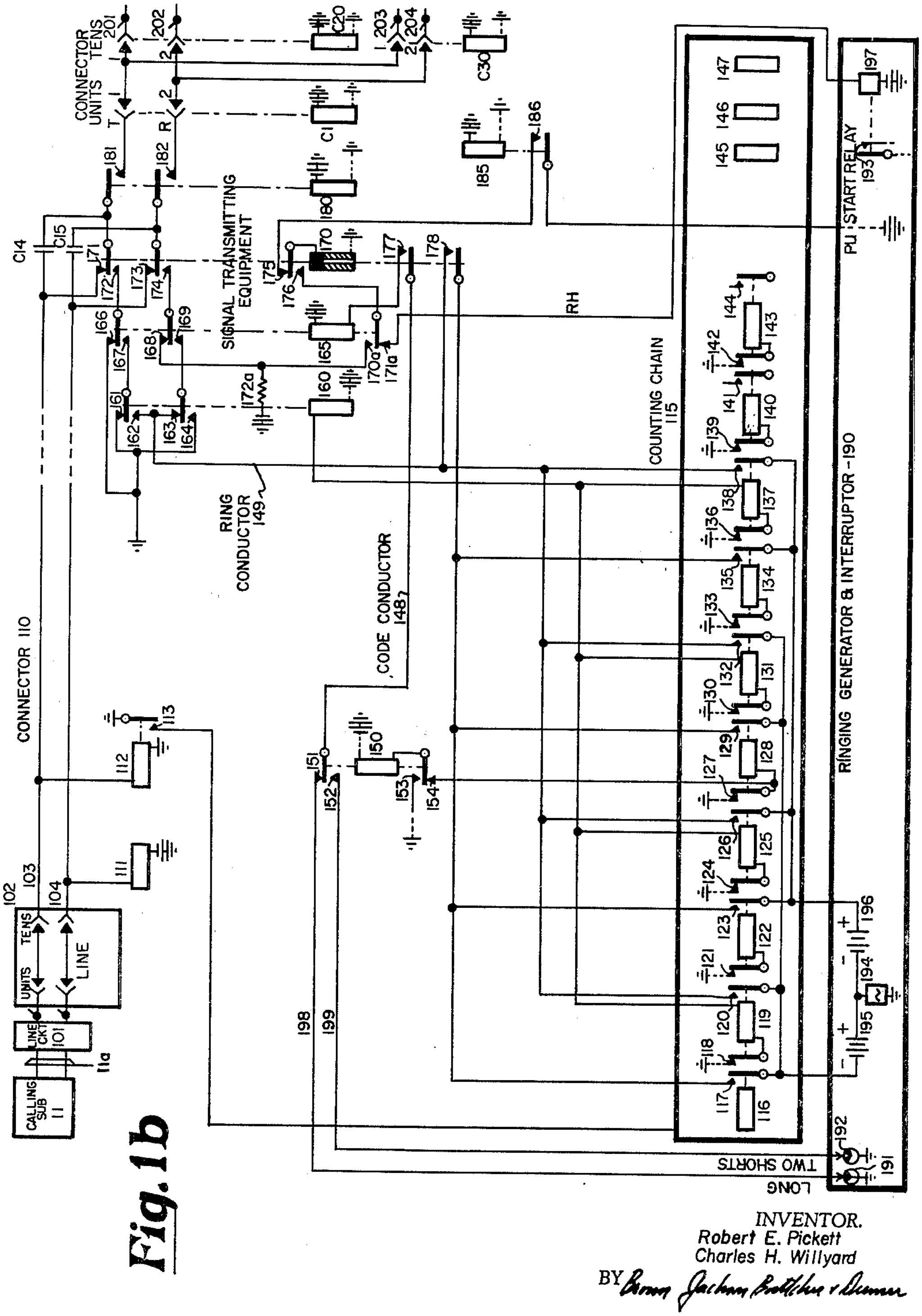

(Relays C1, C20, and C30 are shown in Figure 1*b*.)

In the present exemplary call to the subscriber having the directory number 311, the counting chain effects operation of tens relay C30 and units relay C1, which relays, with the associated connector circuitry, effect extension of a test connection over conductors 203 and 204 to line 31. A busy test is performed by the switching equipment (not shown) in the conventional manner, and in the event that the desired line is idle, a circuit is completed in the connector to relay 180 which operates, and at its contacts 181, 182 further extends the line into the connector.

The calling subscriber now dials the ring digit and the counting chain 115 prepares the associated circuitry for the transmission of a signal which is coded in accordance with the value of the ring digit received. As noted above, each of the subscribers on a substation line, such as the illustrated carrier substation line 31, are selectively signalled by applying signals of different codes and polarity bias to alternate sides of the carrier line. The signalling code pattern, illustrated in the present embodiment, is achieved essentially by dividing the eight subscribers on the line into two primary groups of four each, the first subscriber group including subscribers 1–4 which are assigned a ringing code consisting of one long ring, and the second subscribers group including subscribers 5–8 on the line which are assigned a ringing code of two short rings. The four lines of each of these primary groups are also assigned to two subgroups consisting of the even numbered subscribers and odd numbered subscribers respectively, the even numbered subscribers of each primary group being signalled over the tip side of the line, and the odd numbered subscribers of each primary group being signalled over the ring side of the line. The desired substations of each subgroup are then selected by transmitting signals of different polarity bias, the substations 1, 2, 5, and 6 being assigned signals having a negative polarity bias and parties 3, 4, 7, and 8 being assigned signals having a positive polarity bias. Thus, each party on the line is selectively distinguished from another party on the line by means of a coded signal of a predetermined polarity bias being applied to a predetermined side of the line. The following chart illustrates in a summary manner the pattern of the coded signals transmitted in the system.

CHART II

| Ring Digit | Polarity Bias | Side of Line | Ring Code |
|---|---|---|---|
| 1 | Negative | Ring | One Long. |
| 2 | do | Tip | Do. |
| 3 | Positive | Ring | Do. |
| 4 | do | Tip | Do. |
| 5 | Negative | Ring | Two Short. |
| 6 | do | Tip | Do. |
| 7 | Positive | Ring | Do. |
| 8 | do | Tip | Do. |

Coding of the signals, according to the above pattern, is basically accomplished by the equipment consisting of code preparation relay 150, the side of line marking relay 160 and the signal sources 195, 196, all of which are controlled in a particular manner determined by the position of the counting chain following receipt of the incoming ring digit.

Briefly stated, the code preparation relay 150 determines the code of the signal to be transmitted, the codes in the present example being "one long" or "two short" rings. The counting chain controls the code preparation relay 150 in its operation in accordance with the value of the digit received, the relay being maintained in its deenergized condition responsive to receipt of digits 1–4, whereby its contacts 151 are operative to prepare the "long ring" conductor for use by the signalling equipment. With receipt of the digits 5–8, the counting chain relay operates code preparation relay 150 (see fifth counting chain relay 128 and circuit prepared at its contacts 127, for example); and relay 150 at its contacts 152 prepares the "two short" ring conductor for use by the signalling equipment.

As noted above the signals are applied to the tip conductor if the incoming ring digit is for an even numbered subscriber, and the ring side of the line is signalled if the call is for an odd numbered subscriber. The side of the line to be rung is determined by marking relay 160 at its contacts 161–164, respectively, the relay being maintained in a de-energized condition responsive to receipt of an odd numbered digit, and being energized by the counting chain responsive to receipt of an even numbered digit (see series operating circuits completed for the second counting chain relay 119 and relay 160, etc).

The counting chain 115 in its operation additionally determines the polarity bias of the signal to be applied, the counting chain being effective with receipt of digits 1, 2, 5, 6, to provide a negative polarity bias for use by the signalling equipment (see circuits completed by contacts 117, 120, 129, 132 of the first, second, fifth and sixth counting chain relays), and being operative responsive to receipt of digits 3, 4, 7, 8 to provide a positive polarity bias for use by the signalling equipment (see circuits prepared by contacts 123, 126, 135, 138).

The following chart indicates the signals which are provided by the code preparation relay 150, marking relay 160 and the counting chain 115 as ring digits of different values are received.

CHART III

| Ring Digit | Relay 150 | Relay 160 | Counting Chain Relay | Polarity Bias of Signal Transmitted |
|---|---|---|---|---|
| 1 | De-energized | De-energized | 116 | Negative. |
| 2 | do | Energized | 119 | Do. |
| 3 | do | De-energized | 122 | Positive. |
| 4 | do | Energized | 125 | Do. |
| 5 | Energized | De-energized | 128 | Negative. |
| 6 | do | Energized | 131 | Do. |
| 7 | do | De-energized | 134 | Positive. |
| 8 | do | Energized | 137 | Do. |

(Refer to Chart II, above, to determine which side of line is rung and ringing signal code.)

In the present example in which the call is being extended to a subscriber at substation 311 the first counting chain relay 116 and sequence relay 147 will be in the operated condition following receipt of the ring digit 1. Counting chain relay 116 at its contacts 117 effects the application of ringing current having a negative polarity bias to ring conductor 149. Since the called subscriber is in the first primary group (1–4) code preparation relay 150 remains in the de-energized condition, and at its contacts 151 connects long ring conductor 198 to code conductor 148. Likewise, since the subscriber 1 is an odd numbered subscriber, the side of line relay 160 is in the non-operated condition, and at its contacts 163 prepares the ring conductor 149 for connection to the ring side of the line.

The signals are applied to the line by the ring application relay 165 as controlled by the coded signals applied thereto by the ringing generator and interrupter 190. That is, following receipt of the ring digit, the ring digit completion relay 185 operates in the conventional manner, and at its contacts 186 connects ringing period start relay 170 to the ringing and interrupter circuit 190 over an obvious circuit. If the interrupter is idle, battery is applied over pick-up conductor PU to an energizing circuit for relay 170 to effect the operation thereof. In the event the ringing and interrupter circuit is in operation, the circuit for relay 170 is completed only at such time as will prevent mutilation of a ringing code, i.e., the pause before a ringing cycle.

Relay 170 operates, and at its make-before-break contacts 176 completes a self-holding circuit which extends over contacts 176, 171, conductor RH, and start relay 197 to battery; at its contacts 171, 173 disconnects the normal calling line connections from the called line; at its contacts 172 and 174 extends the called line tip and ring conductors for the seized line 31 to contacts of the ring application relay 165; at its contacts 177 extends the selected one of the code conductors 198, 199 as connected through contacts of relay 150 to code conductor 148 to the ring application relay 165 to control same in its operation; and at its contacts 178 connects the signal conductors which are associated with the odd numbered relays in the counting chain sequence 116, 122 (the first, third, etc. relays) to contacts 162, 163 of the ringing control relay 160. It is noted that the marking conductor associated with the even numbered relays of the counting chain 119, 125 (the second, fourth, etc. relays) are connected directly to the contacts of the marking relay 160 for use in the coding operation, such manner of connection of the respective contact sets being effected to minimize feedback over the ringing conductors.

As the start relay 197 for the ringing generator and interrupter 190 is energized, it is effective to initiate operation of the ringing means illustrated for simplicity of illustration as cams 191, 192 to alternatively connect and remove ground from the ringing conductors 198 and 199. Cam 191 is connected to complete a circuit over conductor 198 for two seconds and to interrupt such circuit for two seconds for long rings, and cam 192 is operative to connect ground to conductor 199 for two seconds with a short released interval in the middle of the two seconds to thereby provide a "two short" ring code. The circuit is then interrupted for four seconds, after which the ringing cycle is repeated.

As noted above, the code ring selected by the operated one of the counting chain relays and the code relay 150 is applied to the ring application relay 165 to control same in the application of a coded alternating current signal with polarity bias as selected by the operated counting chain relay to the side of the line selected by "side of line" relay 160. Thus in the present connection in which ring digit 1 is received, marking relays 150 and 160 are maintained in a non-operated condition, and the first counting chain relay connects the source ∼ of alternating ringing current through the negative bias battery 195 for use, whereby long rings of superimposed ringing current having a negative bias are applied to the ring conductor 204 of the seized line 31, the ring current circuit being traced from ground through alternating current ringing source ∼, through the battery 195 from positive to negative, contacts 117 of the first counting chain of relay 116, contacts 178, 163, 169, 174, and 182, and closed contacts of the operated units relay (C1 in the present example), the closed contacts of the operated tens relay (C30 in the present example), to ring conductors 204. Ground will be found connected to the tip conductors 203 over the path from ground, contacts 161, 167, 172, 181, other make contacts of units relay C1, other make contacts of tens relay C30 to conductor 203. The repeated cycling of the cam 191 effects repeated operation and restoration of the ring application relay 165 which in turn repeats application of the above described signals to conductors 204 and 203.

APPLICATION OF RINGING CURRENT SIGNALS TO THE CHANNEL

The manner in which the coded signals applied to the tip and ring conductors of the seized line (such as 203, 204 in the illustrated connector) are coded for transmission over the carrier circuit is now set forth.

Figure 2:
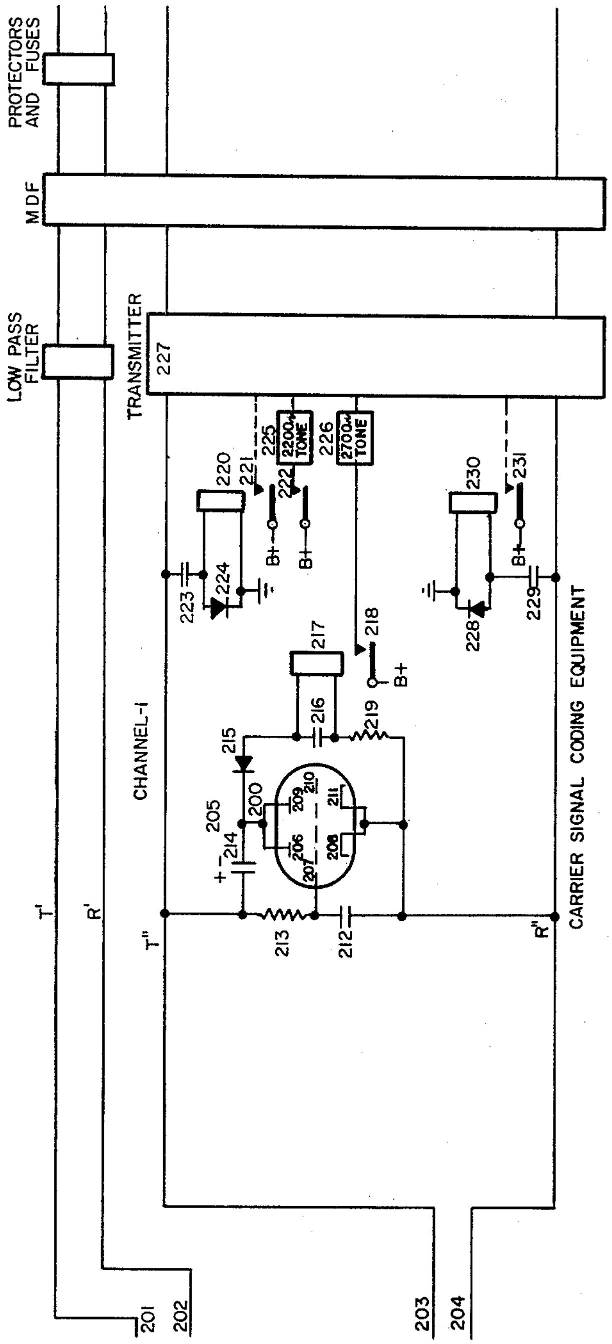

With reference to FIGURE 2 the equipment thereat for effecting carrier signal coding basically comprises a polarity sensing device 205 connected across the tip and ring conductors 203 and 204, a signal detecting device 220 for detecting the application of signals to the tip conductor 203, and a signal detecting device 230 for detecting the presence of a signal on the ring conductor 204.

The signalling devices 220 and 230 are operative with detection of a signal on the tip and ring conductors 203 and 204, respectively, to enable the transmitter 227 of the unit 30 to apply carrier current over the channel connected thereto modulated with the ringing frequency component of the composite signals as applied to conductor 203, 204. The signal sensing device 220 is further operative to enable the 2200 cycle tone generator source 225 for the purpose of modulating the carrier therewith. The polarity sensing device 205 is operative alternatively with detection of a signal having a negative polarity bias on the ring conductor 204 and a positive polarity bias on the tip conductor 203.

It is apparent from the foregoing that signal sensing devices 220 and 230 and polarity sensing device 205, responsive to the receipt of the coded signals input thereto effect the application of the following signals over conductors 232 and 233.

CHART IV

| Ring Digit | Polarity Bias of Signal Placed on Line 31 (Conductors 203 and 204) | Operated Ones of Relays 217, 220 and 230 | Output Signal to Channel over Conductors 232 and 233 |
|---|---|---|---|
| 1 | Neg., Cond. 204 | 217, 230 | Carrier modulated by 2,700 cycle tone. |
| 2 | Neg., Cond. 203 | 220 | Carrier modulated by 2,200 cycle tone. |
| 3 | Pos., Cond. 204 | 230 | Unmodulated carrier. |
| 4 | Pos., Cond. 203 | 217, 220 | Carrier modulated by 2,200 and 2,700 cycle tone. |
| 5 | Neg., Cond. 204 | 217, 230 | Carrier modulated by 2,700 cycle tone. |
| 6 | Neg., Cond. 203 | 220 | Carrier modulated by 2,200 cycle tone. |
| 7 | Pos., Cond. 204 | 230 | Unmodulated carrier. |
| 8 | Pos., Cond. 203 | 217, 220 | Carrier modulated by 2,200 and 2,700 cycle tone. |

The output signals transmitted responsive to receipt of ring digits 1 or 5, 2 or 6, etc., are differentiated by their respective ringing codes; see Chart II, listed hereinbefore.

The manner in which the above signals are generated by the carrier signal coding equipment (FIG. 2) will be apparent from the further description of the exemplary connection via line 31.

As noted above the automatic switching equipment is operative in response to the receipt of the ring digit 1 to effect the application of negatively biassed ringing current over the ring conductor 204 which is of a timed duration consistent with that of one long ring in a telephone exchange. With the receipt of ringing current over ring conductor 204, an operating circuit is completed for channel relay 230, the circuit extending from ground over the winding of relay 230, capacitor 229, conductor 204, the closed contacts of tens relay C30 and units relay C1, contacts 182, 174, 169, 163, 178, 117, through battery 195, and ringing source N to ground, ringing current passing through relay 230 during a portion of each ringing cycle. Ringing current is shunted over rectifier 228 to ground during the remainder of each cycle, at which time circulating current also passes from the coil of relay 230 through the rectifier 228 and back to the coil of relay 230 to thereby provide a slow-to-release characteristic for the relay, to thereby prevent restoration of the relay during the shunt phase of each cycle of ringing current and to permit restoration after long rings, between short rings, and after two short rings. While ringing current is being projected over conductor 204, relay 220 is shunted by ground placed on conductor 203 by equipment 15. It should be noted however that relay 230 operates also with application of positively biassed ringing current to conductor 204, as for example, with the transmission of ring digit 3. Similarly relay 220 is operated whenever ringing current of either positive or negative bias is placed on conductor 203 in which case 15 grounds conductor 204, shunting relay 230.

Channel relay 230 is operated for the period each signal is applied to the ringing conductor 204 (one long ring for example), and in its operation closes contacts 231 to connect operating potential to the carrier channel transmitter 227 which responsively applies carrier current over the channel, via an impedance matching transformer with lightning protection, to physical line 21. See also U.S. Patent No. 2,875,366, which was issued on February 24, 1959, and assigned to the assignee of the present invention.

The negatively biassed ringing current on the ring conductor 204 (together with ground connected to the tip conductor 203) also enables the polarity sense circuit 205 which in its operation effects modulation of the carrier with a 2700 cycle tone. More specifically, the polarity sense circuit 205 comprising a high permeance vacuum triode tube 200, such as the well known type available commercially as a 5965, a control relay 217, and associated circuit components including grid-cathode capacitor 212, grid input resistor 213, plate capacitor 214, load rectifier 215, load relay 217 and shunt capacitor 216, and series resistor 219 connected in the load circuit.

The circuit is connected to utilize the applied direct current signal to bias the grids 207 and 210 of the tube to enable or prohibit conduction from anode to cathode within the tube and utilizes a very minute amount of line current. Condenser 212 prevents the grid potential from fluctuating to any great extent during the application of the superimposed ringing voltage. Control relay 217, which is controlled in its operation by the twin triode tube 200, operates only during the application of ringing voltage to the line and derives all of its operating current from such signal. Further, the relay operates only when the direct current bias is such that the tip conductor 203 is positive with respect to ring conductor 204 (i.e., a positive polarity bias signal applied to tip conductor 203, or a negative polarity bias signal applied to ring conductor 204).

Digressing to consider the operation of the tube generally, when conductor 203 is positive with respect to conductor 204 under either of the two conditions of direct current bias described above, the grids 207 and 210 are rendered positive with respect to the cathodes 208 and 211, thereby preparing the tube for conduction. Ringing voltage superimposed on the direct current bias causes the tube to alternately conduct and cut off as the anodes 206 and 209 alternately become positive and negative with respect to the cathodes 208 and 211. During the portion of the ringing cycle when the tube is conducting, capacitor 214 charges over the path from conductor 203, capacitor 214, the anode-cathode path of tube 200 to conductor 204. During the portion of the ringing cycle when the tube is cut off, capacitor 214 discharges or tends to charge in the opposite direction through rectifier 215, relay 217 and resistor 219, operating relay 217. Capacitor 216, in parallel with relay 217, acts as a smoothing filter for relay 217, maintaining it in the operated condition during ringing cycles.

It is noted that the resistance 213 in the polarity sensing circuit 205 is of a substantially high value so as to limit the total grid current to a normal value well within the rating of the vacuum tube 200. The capacitor 212 acts to minimize grid fluctuation during the application of the superimposed ringing voltage. Capacitor 214 must of necessity be of a value sufficient to present a low impedance to the ringing voltage. Resistance 219 is used to prevent loading of the talking circuit by the capacitor 214, selenium rectifier 215, and the capacitor 216, which components "float" on the line continuously.

In the present example, with the application of negatively biassed ringing curent to the ring conductor 204, the tip conductor 203 is grounded and accordingly, as the positive pole of the battery is grounded, is rendered positive relative to ring conductor 204, and accordingly grids 207 and 210 of the twin triode tube 200 are biassed positive to enable tube conduction. As the ringing voltage is superimposed upon the negative direct current bias voltage on conductor 204, the tube alternately conducts and cuts off as the anodes alternately become positive and negative with respect to the cathodes during cycles of ringing voltage. During the portion of the ringing cycle when the tube is conducting, an obvious charging circuit for capacitor 214 is completed from conductor 203 over capacitor 214, the anode-cathode paths of conducting tube 200 and the ring conductor 204. During the portion of the ringing cycle when the tube is cut off, capacitor 214 discharges or tends to charge in the opposite direction over the circuit comprising rectifier 215, relay 217, and resistance 219. The capacitor 216, in parallel with relay 217, acts as a smoothing filter for the relay 217.

Relay 217 operates, and at its contacts 218 completes an energizing circuit for the 2700 cycle tone generator 226. It will be apparent from the foregoing description, therefore, that with the application of positively biassed ringing current to the tip conductor 203, or a negatively biassed ringing current to the ring conductor 204, polarity sensing device 205 operates relay 217 to effect modulation of the carrier current with a 2700 cycle tone.

Thus, at this point, line 31 has been seized by the switching equipment and coded carrier signals including the ringing frequency signals have been applied to the channel conductors 232, 233 of physical line 21 for the purpose of signalling the desired one of the carrier-subscriber substations 400–470, the coded signal in the present example being comprised of a carrier signal having the duration of one "long" ring and modulated by the ringing frequency signals and a 2700 cycle tone.

CARRIER DECODING EQUIPMENT

In the vicinity of the carrier substations, carrier drop wires are taken off the carrier physicals and connected to carrier signal receiving equipment at the subscriber's end. As shown in FIGURE 3, the receiving equipment may comprise a receiving filter 300, a two-stage amplifier 301, and a demodulator 302 which are connected to apply the received signals to a set of decoding equipment associated with the carrier party substations, which include a "side of the line-finder" circuit 370, a polarity finder circuit 371, a voice amplifier and hybrid circuit 356 and 357, a ringing amplifier circuit 358, and a carrier sense amplifier 363, and associated relays.

GENERAL OPERATION OF DECODING EQUIPMENT

The side of linefinder 370 in the decoding equipment is operative to detect the presence of 2200 cycle tone, and with the detection of such tone to release normally operated associated control relay 327 which grounds the ring side 368 of the subscriber line for ringing. Briefly, the input circuit for the side of linefinder circuit 370 is connected to the output of demodulator 302 and includes capacitor 311 and resistance 312, series connected between the demodulator 302 and the 2200 cycle filter comprising inductance 314 and capacitor 315 connected as shown. The output of the filter is connected to the grid-cathode circuit of a normally conducting triode amplifier 316 which amplfies the 2200 cycle tone, resulting in a 2200 cycle oscillating signal potential on the anode 318 of tube 316. As the anode becomes more positive during cycling, output current through condenser 322 is shunted to ground through rectifier 323 causing the charge on condenser 322 to increase. It is noted that relays 327 and 328 are normally operated through normally conducting tubes 330 and 347. As the anode becomes less positive during cycling, current through condenser 322, rectifier 324, and condenser 325 to ground results in a negative potential on grid 332 of normally conducting triode 330 and on condenser 325, which maintains grid 332 negative during receipt of 2200 cycle tone. The charge on condenser 322 decreases. As a result of driving the grid 332 negative, tube 330 so reduces its conduction that relay 327 releases, and at its contacts 329, connects ground potential to the ring conductor 368 of the carrier substation line for substation signalling.

With the absence of such tone in the incoming signal, relay 327 remains in the operated condition, and at its contacts 328 applies ground potential to the tip conductor 367 of the carrier substation line for substation signalling.

The polarity finder circuit 371 is similar to the side of linefinder circuit 370 and basically comprises an input path including capacitor-resistance network 313, 334 which connects the output of demodulator 302 to a filter network comprises of inductance 335 and capacitor 336 which is operative to detect the presence of 2700 cycle tone in the incoming signal. The polarity finder circuit is similar in structure to the side of linefinder circuit 370 and consists basically of a triode amplifier tube 338 having its grid circuit connected to the output of the filter 335, 336, and its output circuit connected over a similar network comprised of rectifiers 344, 345 to the input of the triode 347. Control relay 348 is connected in the plate circuit of the triode 347, whereby with detection of 2700 cycle tone in the signal by the filter and amplification by triode 338, a signal is applied to the grid of triode 347 to cause 347 to so reduce conduction therein as to effect release of the control relay 348. Control relay 348 releases, and at its contacts 352 connects the negative terminal of the 50 volt battery through winding **366*b* to the ring conductor 368 and the positive terminal of the 50 volt battery through winding 366*a* to the tip conductor 367**.

In the absence of 2700 cycle tone in the incoming signal, the control relay 348 remains in the operated condition, and at its contacts 351 connects the positive terminal of the 50 volt battery through winding **366*b* to the ring conductor 368 and at its contacts 349 connects the negative pole through winding 366*a* to the tip conductor 367**.

CARRIER SENSE AMPLIFIER

The output conductor of the demodulator 302 is additionally connected to a carrier sense amplifier which detects the presence of carrier in the circuit, and is operative responsive to the detection of same to complete an energizing circuit for an associated control relay 364. Contacts 382, indicated by a dotted line, are on a relay (not shown) but which operates responsive to removal of the handset from the cradle at any of the subscriber subsets 311–318. When this relay operates it opens contacts 382 disabling carrier sense relay 364. Thus relay 364 is non-operated if carrier is not present on the channel; or if carrier is present, relay 364 is non-operated if the relay controlling contacts 382 is operated. If control relay 364 is in the non-operated condition, it is effective at its contacts **358*a* to withhold B+ from the ringing amplifier and at its contacts 359 and 361 to connect the primary winding of the transformer 366 to the output side of the voice amplifier 356 and hybrid circuit 357, whereby the two-wire voice current output of the hybrid 357 is passed through the primary of transformer 366 to the secondaries 366*a*, 366*b* thereof for application to the carrier party line. With control relay 364 operated, it is effective at its contacts 358*a* to connect B+ to the ringing amplifier and at its contacts 360 and 362 to connect the primary of transformer 366 to the output of ringing amplifier 358, whereby the ringing frequency signals received over the channels are induced in secondary coils 366*a* and 366*b*, for superimposing on the 50 volt battery to signal the carrier subsets. On a call to a carrier subset from the telephone exchange, relay 364 is operated until answer whereupon contacts 382 release relay 364. On a call initiated by a subscriber at a carrier subset, contacts 382 operate immediately and prevent the operation of relay 364** for the duration of the call.

It is noted that the secondaries **366*a*—366*b*, which are coupled by capacitor 366***c*, extend to the subscriber tip and ring conductors 367, 368, whereby voice currents and ringing currents may be applied thereover by the transformer.

As the called party answers, associated equipment (not shown, but indicated by the dotted lines) interrupts the circuit for the carrier sense relay 364 to effect continued connection of the voice amplifier in the connection during the ensuing conversation.

It will be recalled that in the exemplary call to the subscriber having directory number 311, the equipment at the transmitting end of the channel effected the application of carrier current plus 2700 cycle tone to the channel. As noted above, the carrier sense amplifier 363 is operative responsive to the detection of the carrier current to complete an energizing circuit for its control relay 364 which is effective at its contacts 360 and 362 to connect the primary of transformer 366 to the output of the ring amplifier 358 so that the ringing signals will be applied through the transformer to the carrier subscriber party line. The polarity finder 371 circuit is operative responsive to detection of the 2700 cycle tone to release its control relay 348, which at its contacts 352 connects the negative terminal of the 50 volt battery to the ring conductor 368, and at its contacts 350 connects the positive terminal of such source to conductor 367.

The side of linefinder circuit 370, failing to detect the presence of 2200 cycle tone in the incoming signal, maintains its control relay 327 in the operated condition, whereby ground is connected over contacts 380 and 328 to the tip conductor 367, whereby with relay 348 released, the positive pole of the 50 volt battery is grounded. The manner in which the first subscriber substation 400 is operated in response to the application of such signals is now set forth.

CARRIER PARTY LINE

With reference to FIGURE 4, the party line comprising tip conductor 367 and ring conductor 368 is illustrated as serving eight carrier party subscribers 400, 410 . . . 470, it being apparent that a larger number can be readily connected thereto.

With reference to the first substation 400, it is apparent that terminals 401 and 408 are provided for connecting the subset, including the transmitter and receiver elements to the party line, the equipment for accomplishing such connection being conventional in nature and being indicated by dotted lines connected thereto. The signalling equipment at the substation includes a ringer 407 and associated three-element cold cathode tube 402 connected to respond to the application of negatively biassed ringing current to the ring conductor 368. That is, the first electrode 404 of the control gap for the three-element tube 402 is connected over terminal 408 to the ring conductor 368. The main anode 403 is connected in series with ringer 407 and over terminal 409 to ground. A resistance 406 is connected between the second electrode 405 and ground. Thus with the receipt of a carrier signal modulated with 2700 cycle tone over the channel, the decoding equipment effects connection of the negative terminal of the fifty volt battery source over the contacts 352, secondary winding 366*b*, ring conductor 368, and terminal 408 to the first control electrode 404. In that the second control electrode 405 of the tube 402 at the first carrier substation 400 is connected to the positive terminal of the fifty volt battery source over a circuit which extends from the positive terminal of the fifty volt battery over contacts 350, the secondary winding 366*a*, contacts 328 and contacts 380 indicated by dotted line, ground, and resistor 406, the second control electrode 405 is biassed positive with respect to the first control electrode 404. It should be observed that contacts 380 and 382 indicated by dotted lines are closed for ringing and contacts 381 indicated by dotted line are open during ringing. During the conversation period, contacts 380 and 382 are open and contacts 381 are closed. These contacts are on a dialling and answer relay (not shown) in the signalling equipment which operates responsive to the carrier subscriber lifting the receiver from its cradle, placing a loop across the subscriber line. Thus after answer on a call to a carrier subscriber, or upon initiation of a call by a carrier subscriber contacts 382 disable the carrier sense relay 364 and contacts 380 and 381 set up talking conditions.

With the application of a negative ringing signal to the ring conductor 368, the control gap between electrodes 404 and 405 breaks down, which in turn fires the main gap between electrode 404 and the main anode 403. As the main gap is fired the negatively biased ringing current on the ring conductor 368 is applied over the first electrode 404, the space current path, the main anode 403, and the ringer 407 to ground, and the ringer is operated in response thereto. The signals for the first group of subscribers (1–4) and the second group of subscribers (5–8) on the line are the same with the exception that the subscribers of the first group are signalled by the code consisting of one long ring and the parties of the second group are signalled by the code consisting of two short rings. Accordingly, the ringer device at the fifth substation will be connected in the manner of the first substation, the ringer evice of the sixth substation will be connected in the manner of the second substation, etc.

With reference to the substation for the second subscriber 410 on the line, it is apparent that the first electrode 414 of the three-element tube 412 in this arrangement is connected to the tip conductor 367. Thus, with the receipt of carrier current plus 2200 cycle tone (the code signal for the second party), the decoding equipment effects the application of negatively biassed ringing current over contacts 349, the secondary winding 366*a*, and tip conductor 367 to the first control electrode 414. Since the second control electrode 415 is connected to the positive terminal of the fifty volt battery source over resistor 416, ground, contacts 380 and 329, winding 366*b*, and contacts 351, the second control electrode 415 is biassed positive with respect to the first control electrode 414. Thus with the application of the ringing current over the secondary windings 366*a*, 366*b*, and over conductor 367, the control gap between electrodes 414 and 415 will be ionized and fired, in turn effecting firing of the main gap between control electrode 414 and main anode 413, and thus effecting operation of ringer 417.

In the disclosed signalling pattern the third partry is signalled with the receipt of a carrier current alone over the channel, whereby the postive battery is connected over contacts 351, secondary winding 366*b*, ring conductor 368, resistance 426, to the first control electrode 424 of the three-element cold cathode tube 422 at the third carrier substation. The negative terminal of the fifty volt battery is connected over contacts 349, the secondary winding 366*a*, contacts 329 and 380, ground, and the second control electrode 425 to bias same negative with respect to the first control electrode 424. With the application of the ringing current over the transformer 366 and consequently the positively biassed ringing current over the ring conductor 368, the control gap between electrodes 424 and 425 is ionized, in turn effecting firing of the main gap between control electrode 424 and main anode 423. The ringer 427 is thereupon selectively operated.

In the present pattern the fourth carrier substation 430 is signalled responsive to the receipt of carrier current modulated by 2200 and 2700 cycle tones over the channel, the decoding equipment being operative responsive thereto to connect the positive terminal of the fifty volt battery source over contacts 350, transformer secondary 366*a*, tip conductor 367, and resistance 436 to the first control electrode 434 of tube 432. Simultaneously, the negative terminal of the fifty volt battery source is connected over contacts 352, transformer secondary 366b, contacts 329 and 380, ground, and terminal 439 to the second control electrode 435 to bias same negative relative to the first control electrode 434. With the application of the signal over secondary windings 366a, 366b, the control gap between electrodes 434, 435 is ionized and fired, in turn effecting firing of the main gap between control electrode 434 and main anode 433 to thereby effect operation of the ringer 437 over an obvious circuit.

As noted above, the substation equipment for carrier subscribers 440–470 is connected in the manner of the first four carrier subscribers 400–430, and the operation of such equipment is effected in the manner above described, the parties of the two groups being selectively distinguished by reason of the two different ringing codes applied for the groups, i.e., one long ring for the first group, and two short rings for the second group.

Although the illustrated system sets forth the transmission of ringing current over the carrier channel, it is apparent that the ringing amplifier 358 could be replaced with a local source of ringing current at the subscriber end of the channel. In such event the carrier sense amplifier relay 364, in its operation, would effect the application of ringing current therefrom to the primary of the transformer. Other modifications of the equipment will be obvious to those skilled in the art.

While what is described to be regarded as a preferred embodiment in the invention, it will be apparent that variations, rearrangements, modifications and changes may be made therein without departing from the scope of the present invention as defined by the appended claims.

What is claimed is:

1. In an automatic telephone system including carrier signalling equipment having transmitter means for transmitting coded carrier signals over an outgoing circuit, an input circuit for said carrier signalling equipment having a plurality of conductors over which composite signals having a direct current component of different polarities are received, a first means operative to control said transmitter means to transmit carrier current modulated by a first tone responsive to application of a ringing signal to one of said conductors, a second means operative to control said transmitter means to transmit carrier current without modulation by said first tone responsive to application of a ringing signal to the second one of said conductors, and a polarity sensing device operative to provide a second tone to modulate the carrier current transmission initiated by said first and second means responsive to the application of composite signals having a direct current component of only predetermined polarities to said first and second conductors and to withhold said second tone modulation responsive to the application of a composite signal having a direct current component of other different polarities to said first and second conductors, the presence of said carrier current on said channel without modulation by a tone being thereby representative of the coupling of a predetermined one of said composite signals to a predetermined one of said conductors.

2. In an automatic telephone system including carrier signalling equipment having transmitter means for transmitting coded carrier signals over an outgoing circuit, an input circuit for said carrier signalling equipment having a plurality of conductors over which composite signals having a direct current component of different polarities are received, a first signal responsive means operative to control said transmitter means to initiate transmission of carrier current modulated by a first tone responsive to receipt of a composite signal over the first one of said conductors and to terminate the transmission responsive to removal of the signal, a second signal responsive means operative to control said transmitter means to transmit carrier current without modulation by said first tone responsive to application of a composite signal to the second one of said conductors and to terminate the transmission responsive to removal of the signal, and a polarity sensing device operative to provide a second tone to modulate the carrier current transmission initiated by said first and second means responsive to the receipt of composite signals having a direct current component of only predetermined polarities over said first and second conductors and to withhold said second tone modulation responsive to the application of a composite signal having a direct current component of other different polarities to said first and second conductors, the presence of said carrier current on said channel without tone modulation being assigned to represent the coupling of a predetermined one of said composite signals to a predetermined one of said conductors.

3. In an automatic telephone system including local carrier signalling equipment for transmitting coded carrier signals over a channel to enable associated carrier equipment to signal carrier substations connected to a carrier line, an input circuit for said local carrier signalling equipment including a plurality of conductors over which composite signals having a ringing frequency component and a direct current component of one of a plurality of different polarities are received, carrier transmitting means in said carrier signalling equipment connected to said input means operative to couple the ringing frequency components of the composite signals and the incoming voice frequencies over said channel, a first means operative to transmit carrier current modulated by a first tone over said channel responsive to receipt of a composite signal over a first one of said conductors, a second means operative to control said carrier transmitting means to transmit carrier current without said first tone modulation over said channel responsive to receipt of a composite signal over the second one of said conductors, and a polarity sensing device operative to provide a second tone to modulate the carrier current transmission initiated by said first and second means responsive to the receipt of composite signals having a direct current component of predetermined polarities over said first and second conductors whereby the ringing frequency signals and the coded carrier current signals are coupled to the channel simultaneously; receiving means including carrier sensing means connected to said channel, decoding means for preparing a circuit for coupling a potential of a polarity and to the side of the line which are represented by the coded signal, ringing equipment for coupling the ringing frequency signals on the channel over the circuit prepared by the decoding means to the associated substations on the line, and means controlled by said carrier sensing means to enable the ringing equipment for operation only during the period of receipt of carrier current over the channel from said transmitter means during the ringing period of the connection.

4. In an automatic telephone system including local carrier signalling equipment for transmitting voice signals coded carrier signals and ringing frequency signals over a channel to enable distant associated carrier equipment to selectively signal different carrier substations on a line connected thereto in which the presence and absence of a ringing signal is represented by the presence and absence of the ringing frequency signals and the carrier current on the channel, and in which the side of the line to be signalled is represented alternatively by a carrier current with a first modulating tone and a carrier current without said first modulating tone and the one of two parties on the side of the line to be rung is represented alternatively by the carrier current with and without a second modulating tone, receiving means including voice amplifier means normally coupled to the line for amplifying the voice frequencies transmitted thereto, decoding means for preparing a circuit for coupling a potential of a polarity and to the side of the line which are represented by the coded signals, ringing equipment for coupling the ringing frequency signals on the channel over the circuit prepared to the line, carrier sensing means for detecting the presence of carrier current on the channel, and means controlled by said carrier sensing means to disconnect said voice amplifier from the line and to connect said ringing equipment to the line responsive to the detection of carrier current on the channel during the ringing period of a connection.

5. A system such as set forth in claim 4 in which said decoding means includes a first means controlled in its operation by one of said tones to determine the side of the line to be rung, and a second means controlled in its operation by the other of said tones to determine the direct current bias of the ringing current to be coupled to the indicated side of the line.

6. A system as set forth in claim 5 in which said first and second means comprise identical tone responsive circuits which are respectively tuned to the different first and second tones, each circuit comprising a tuned circuit for selecting the tone assigned thereto, at least one switching tube which is operated to different conditions by said tuned circuit in its response to its assigned tone, and relay switching means controlled by the associated switching tube to apply different predetermined signals to the line responsive to operation of its associated switching tube to said different conditions.

References Cited in the file of this patent

UNITED STATES PATENTS

| | | |
|---|---|---|
| 1,873,255 | Arnold | Aug. 23, 1932 |
| 2,511,617 | Barstow | June 13, 1950 |
| 2,516,763 | Edson et al. | July 25, 1950 |
| 2,535,446 | Mitchell | Dec. 26, 1950 |
| 2,733,296 | Maggio | Jan. 31, 1956 |
| 2,763,726 | Weller | Sept. 18, 1956 |
| 2,773,934 | Trousdale | Dec. 11, 1956 |